Nov. 30, 1937.  F. W. CUTLER  2,100,942
METHOD OF WASHING FRUITS, VEGETABLES, AND OTHER PRODUCTS
Filed June 6, 1934  2 Sheets-Sheet 1
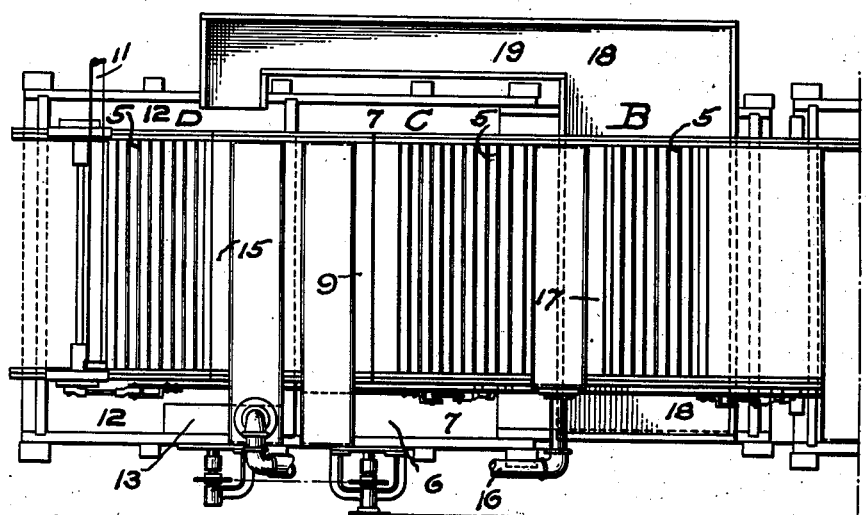
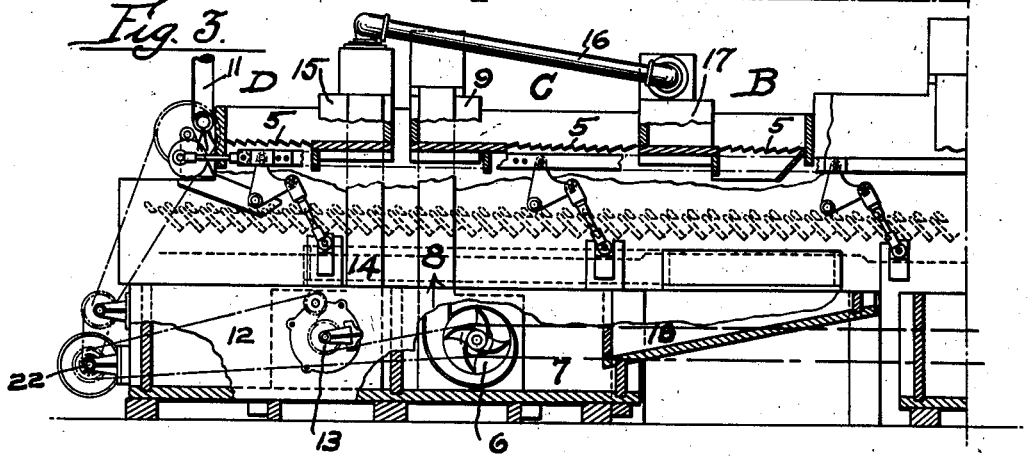

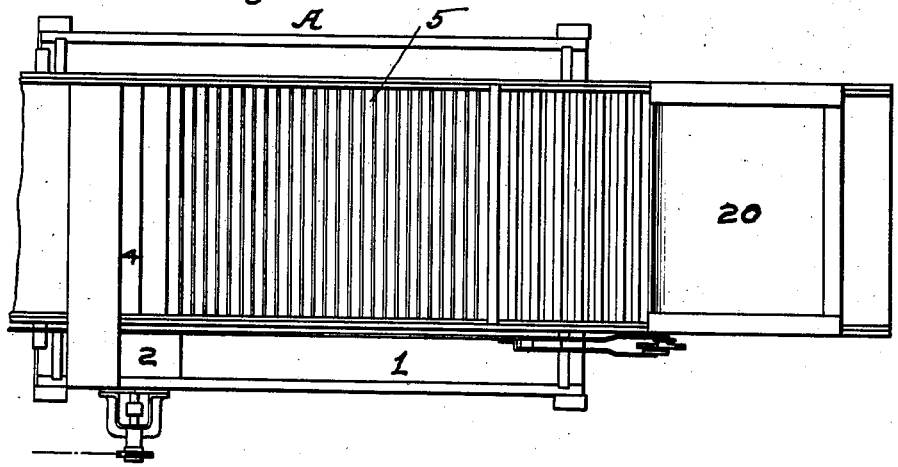
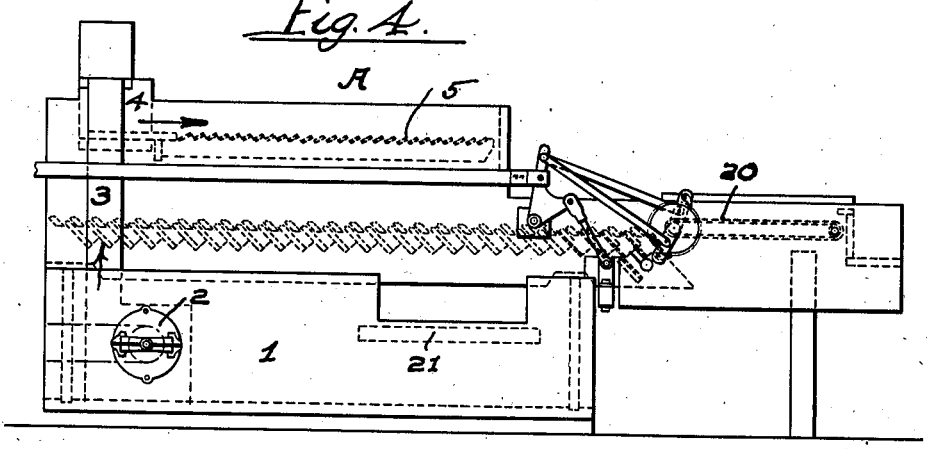

Patented Nov. 30, 1937

2,100,942

UNITED STATES PATENT OFFICE 2,100,942

METHOD OF WASHING FRUITS, VEGETABLES, AND OTHER PRODUCTS

Frank W. Cutler, Portland, Oreg., assignor to Food Machinery Corporation, San Jose, Calif., a corporation of Delaware Application June 6, 1934, Serial No. 729,328

2 Claims. (Cl. 99—100)

This invention relates to an apparatus and method for removing deposits such as spray residue and other accumulations from the outer surfaces of fruit and the like and is particularly adapted to the removal of spray residue from apples and pears, which residue has been accumulated during the growing period from applications made to the apples for the control of insect pests and fungus growths.

It is commonly known and understood that apples develop during their growing period and after picking, a waxy coating on the surface of the fruit. It is also commonly recognized that the spray residue applied to the fruit prior to or during the period of formation of the wax coating on the apples becomes more or less covered up and embedded therein which renders it very difficult of removal.

A difficult phase of the problem presented in the effective removal of spray residue such as arsenate of lead from the surfaces of the fruit, is to bring the chemical washing solution into contact with the spray residue embedded in the wax coating on the fruit.

One of the commonly used washing solutions for this purpose is dilute hydrochloric acid in strength at from ½ to 2 per cent by weight of acid, but it has been found that this solution is not fully effective and is more or less inadequate in the removal of embedded residue.

The hydrochloric wash is ordinarily effective in the removal of spray residue on early fall varieties of apples, which do not develop heavy wax coatings, and the hydrochloric acid solution often obtains the desired spray removal down to the tolerances set by the Federal Government with respect to allowable arsenic and lead, when the solution is applied at proper concentration and temperature within a comparatively short period after picking of the late or winter varieties of apples. It is recognized, however, that apples after being picked form an increased waxy coating on the surfaces of the fruit and that the removal of spray residue from these apples becomes increasingly difficult unless the washing solution employed is detergent in character and capable in itself of dissolving some of the wax coating from the fruit or of removing some of the wax coating.

Dilute hydrochloric acid as commonly used in commercial washing of apples does not have this detergent or wax removing quality, although it is recognized that the dilute hydrochloric acid is an effective re-agent for the removal of the arsenic and lead providing it can come into actual contact with the residue.

It has been found that alkaline solutions are also effective in the removal of spray residue because of the ability of the alkaline solutions to dissolve the wax coating on the fruit, but the effectiveness of the spray residue removal, either when hydrochloric acid or alkaline washes such as silicate of soda is employed, depends seemingly upon the character of the spray material which has been applied to the fruit.

It is quite common practice in apple and pear growing to combine mineral oil with arsenate of lead spray, which is recognized as the most effective spray for combating the codling moth, in order to enhance the effectiveness of this spray and it is generally recognized by scientific experts that hydrochloric acid wash solution is more effective in the removal of the spray residue remaining on the fruit from said combination after harvest, than alkaline wash solutions such as sodium silicate. On the other hand, when fish oil has been used in combination with the arsenate of lead spray, alkaline wash solutions such as sodium silicate are more effective in spray residue removal.

It should be further mentioned that there are apparently many variable factors entering into and affecting the degree of spray residue removal from fruit, whatever washing solution may be employed. Not only does the wax coating on the fruit and the type of spray which has been used affect the degree of spray removal in the washing process, but it is apparent that the conditions under which the fruit has been grown, the condition of the weather at the time of picking, the manner in which the fruit has been handled or stored after picking, all affect the degree of spray residue removal with any given process.

On some lots of fruit one type of washing solution gives the best results, and on another lot another type of washing solution is more effective, and for reasons not easily explainable.

It is vitally necessary to the growers and packers of apples and pears who are preparing their product for market, that the spray residue thereon shall have been eliminated down to or well below the tolerances set by the Federal Government and by foreign countries.

Fruit shipped in interstate or foreign commerce having spray residue thereon in excess of the Federal tolerances is subject to seizure and condemnation.

In ordinary practice samples of fruit taken during the packing process and after the same has been subjected to the usual spray removal process, are analyzed and certificates must be obtained showing compliance with the Federal tolerances before shipment of the fruit can be made. Fruit showing greater residue than allowed by the Federal tolerances must be unpacked and rewashed, at a very considerable expense. It is therefore imperative that in commercial apple and pear packing that the spray removal process be effective in reducing the spray residue on the fruit to a point safely below the Federal tolerances, regardless of the particular condition of the fruit, conditions under which it was grown, conditions at harvest time, the combinations of sprays applied to the fruit while being grown and the length of time elapsing between the harvest and the washing of the fruit. The growing conditions vary from year to year. The types of spray applied must often be varied from season to season, in accordance with new or changing conditions, all of which constitute the variable quantities in the problem of spray residue removal. These problems are particularly complicated in commercial packing houses handling apples and pears from a large number of growers, whose programs are often of varied character, and whose fruit has been grown under differing conditions. It is highly desirable that the spray residue removal process be capable of meeting all of these variable conditions and therein lies the essence of this invention.

The method and apparatus disclosed herein is what might be aptly termed a "Dual process", in that a primary solution that is ordinarily alkaline and detergent in character is followed by a secondary solution that is ordinarily acid in character. This combination being preferable because the detergent wax dissolving solution being applied first, removes some of the wax coating from the fruit or softens it so that a more effective chemical reaction of the secondary acid solution may more readily and effectively take place, and furthermore with the dual character of the process, both classes of fruit, i. e. that which ordinarily responds more effectively to a washing solution alkaline and detergent in character, and that class of fruit which responds more effectively to the application of acid solutions such as hydrochloric acid, may be handled through the same machine and in the same process without change.

In carrying out the process the fruit is first subjected to a flood volume of alkaline solution which cascades over the body of moving fruit and completely envelops it to get the maximum dissolving or softening effect while the fruit is passing. It is then subjected to a rinse bath of water to wash away the adhering alkaline solution before entering into the zone of the acid bath. The fruit is then subjected to an acid solution, also in flood volume while it is passing through the machine and is being rolled over and over so all parts and surfaces of the fruit will be subjected to the flow of solution. When the moving fruit passes from the zone of the acid treatment it again passes through a rinse zone where water is applied in flood volume to wash away the adhering acid solution.

In this process the rinse water washing away the alkaline solution after the alkaline treatment is deposited in a suitable receiving tank where it is recirculated to be used over and over. The rinse water washing away the acid solution from the fruit after the acid treatment is also deposited in a suitable receiving tank from where it is recirculated to be used over and over again. These two tanks holding the alkaline wash water and the acid wash water are connected by a recirculating system and are thereby continually intermixed, the alkalinity of the alkaline solution tending to neutralize the acidity carried over by the acid solution wash waters. By mingling the two washing waters the alkaline predominates, because alkaline solutions adhere to the fruit in greater quantity when passing from the alkaline bath than the amount of acid solutions adhering to the fruit when passing from the acid bath to the final rinse which is a spray of fresh clean water projected onto the fruit to wash off the adhering acid wash water. This predominance of alkalinity in the final rinse wash insures that the moisture which is unavoidably carried over on the fruit upon completion of the washing process is alkaline rather than acid in character. This is a very important point as it is generally recognized by scientific experts that alkaline solutions retard and tend to inhibit growth and development of mold organisms which cause decay of the fruit after packing, whereas, moisture of an acid reaction remaining on the fruit or in the stem or calyx cavities tend to the development of such decay. While there is a final rinse of clear water this does not always dislodge all of the solution adhering in these cavities.

It is an object of the invention to provide a machine and process for the removal of spray residue from fruits and vegetables, more effective as to the amount of spray residue removed than has heretofore been accomplished by commercial washers.

It is also an object of the invention to provide an apparatus and method capable of removing spray residue of varied character from fruits and vegetables.

A further object of the invention is to provide a machine and process for removing spray residue from fruits and vegetables which will require less temperature and less concentration of the chemicals or washing solutions than has heretofore been possible for given results.

It is a further object of the invention to provide a machine and process for removing spray residue from fruits and vegetables which will provide, automatically, without the addition of chemicals, a final rinse water application that will be slightly alkaline or neutral in character rather than acid in reaction.

It is a further object of the invention to provide a solution recirculating system whereby the rinse solutions will be mixed and recirculated to their several treating zones, the mixing tending to counteract the acidity and alkalinity of the solutions from continued use.

It is also an object of the invention to provide a machine and process in a single operative unit capable of handling a varied product without material change or adjustment or loss of time during operation.

With such objects in view as well as other advantages which may be inherent in the invention, consisting in the parts and combinations hereinafter set forth and claimed, it is understood that the several necessary elements, parts and combinations constituting the same may be varied in their proportions, placement and general arrangement without departing from the scope and nature of the invention, and in order to make the invention more clearly understood, there are shown in the accompanying drawings, somewhat diagrammatically, a preferred means and mechanism for placing the same in concrete form, without limiting the improvements to the particular construction shown.

Reference now being had to the accompanying drawings a better and clearer understanding of the process and apparatus will be had.

Figures 1 and 2 represent detached plan views of an apparatus embodying the invention.

Figures 3 and 4 are detached side elevations of Figures 1 and 2 with parts broken away to show interior structure.

As has been mentioned in the foregoing general description of the method and apparatus constituting this invention there are a series of treating stations and a series of rinsing stations through which the stream of moving product is passed successively. The first station "A" constitutes an alkaline treatment, the station "B" a rinse section, the station "C" an acid treating station and the station "D" a final rinse station.

An alkaline solution tank is provided as indicated by the numeral 1. A suitable circulating pump 2 is located to draw solution from the tank 1 and raise it through the flume 3 into the distributing chamber 4 where the solution is spread out and caused to flow in the direction of the arrow over the reversely arranged glass shutters 5 which have the effect of spreading the flow of solution over the entire area and cause a flood of solution to drop onto the passing product. The solution encountering the product flows all over it and completely envelops it so that all portions of the outer surfaces of the product are contacted with the solution which dissolves away some of the spray residue and softens the natural wax coating so that the following treatments will be able to remove what remains. This first treating solution as has been explained is alkaline for apples and pears, but on account of the arrangement of the operative elements of the apparatus any type or kind of solution may be handled as a first treatment whether acid or alkaline. As the solution passes downward away from the product it falls back into the tank 1 and is recirculated by the pump 2 for reuse so long as it is suitable for further use. The operation here is continuous, the solution flowing continually and a stream of product passing continually through the falling solution.

As the product passes on through the machine it reaches the station "B" where it is subjected to a rinsing treatment to wash off the excess and adhering alkaline solution carried over from the treatment at station "A". As soon as the moving stream of product passes the rinsing station "B" it enters the zone of the acid treating station "C" where a flood volume of acid solution is discharged onto the stream of moving fruit in substantially the same manner as has been described for the alkaline treatment. The pump 6 taking acid solution from the tank 7 elevates it through the flume 8 to the distributing chamber 9 where it is flowed out over the glass shutters 10, also placed in reverse direction so the solution will spread over the entire area and falls down onto the fruit, enveloping each fruit completely and acting to absorb, loosen and wash off the adhering spray and other residue accumulated during the growing period. In these treatments it is desirable that the fruit be turned continually so that all surfaces will contact with the solution and so the solutions will get into the stem and calyx ends of the product and clear out the residue deposited there.

When the acid treated product passes from the station "C" it enters the final rinse station "D" where the adhering acid solution is washed from the fruit and just as it passes from the machine it is subjected to a spray of clean clear water from the pipe 11 which leaves the product in a completely treated and washed condition.

In order to maintain the rinse solution that removes the adhering acid solution from the product as it passes from the station "C" in an alkaline or neutral condition the wash solution for the final rinse station "D" is contained in the tank 12 and is elevated by the pump 13 through the flume 14 to the distributing chamber 15 where a part is discharged by the distributing head 15 out over the glass shutters 5 from where it falls in flood volume onto the passing fruit. The other part of the solution raised by the pump 13 passes out through the pipe 16 to the distributing head 17 which acts to distribute the solution out over the glass shutters 5 from where it falls onto the passing fruit as it comes from the alkaline treating station and acts as the washing fluid to wash the adhering alkali from the passing product.

This manner of connecting the washing fluid with the two rinse stations "B" and "D" mixes the solutions and prevents either from becoming too alkaline or too acid, with the result that both wash solutions may be used for a longer period without replacement and in each instance the washing action is much improved. The washing fluid falling down onto and over the product at station "B" passes down through the stream of product and drops into the flume 18 which extends transversely of the machine and flows back to the tank 12 through the channel 19. Thus the two washing fluids are continually mixed and recirculated during the continued operation of the machine.

The manner of moving the product through the machine is immaterial so long as the individual pieces of product are moved slowly and turned over and over through a plurality of changing axes so that all surfaces will be contacted with the falling solutions.

The type of conveyor shown is what is known in the industry as the "Cutler-Moe Shuffle Conveyor" and is separately covered by Moe patents so does not need a special description here further than to say that the feed comprises a series of fixed transverse bars angularly inclined in the direction of feed and spaced apart to permit of placing movable angularly inclined bars between the fixed bars, the series of bars, all on edge, forming the sole support and moving means for the product. The movable bars are all secured to a frame member that is raised and lowered thus carrying the top edges of the movable bars, first above and then below the top edges of the fixed bars with the result that the product is lifted and rolled along the top edges of the series of bars and is thus gradually advanced and rolled over and over as it is passed through the machine in a continuous manner from the feed end to the discharge end.

Product is placed on the preliminary feed belt 20 either by hand or from any source of supply not shown, from where it is deposited onto the feed bars and advanced gradually through the machine as has been described.

When the product is first placed on the feed bars there is more or less of debris carried thereby such as pieces of stems, leaves, twigs etc. These drop down through the spaces between the bars and collect on the leaf trap 21 which is removed periodically and emptied.

Means for driving the various movable elements are provided in the drive shaft 22 and the connections therefrom to the various moving parts which are clearly shown and followed through the machine.

In employing the various solutions adapted to this process they may be used hot or cold as the product and manner of handling necessitates. For example the primary alkaline and detergent solution may be heated to approximately 110 degrees F., then after the product is rinsed and subjected to the acid solution this may carry a temperature of 100 to 105 degrees F. These temperatures are only approximate and may be varied within wide limits to suit any fruit and any manner of processing. Usually the higher the temperature possible with a product the shorter the time of treatment and sometimes the more effective, although the delicate nature of some products will not tolerate a high temperature. These things must be regulated by the packer according to conditions under which he is operating and the type and variety of product being handled.

What I claim as new and desire to secure by Letters Patent is:

1. A process of washing fruit to remove spray residue therefrom preparatory to packing, comprising subjecting the fruit to an alkaline washing treatment, rinsing the fruit with liquid from a source of substantially neutral rinse liquid to remove the alkaline washing liquid adhering to the fruit and returning the mixed rinsing and alkaline washing liquids to said source, then subjecting the fruit to an acid washing treatment, and thereafter rinsing the fruit with liquid from said source to remove the acid washing liquid adhering to the fruit and then returning the mixed rinsing and acid washing liquids to said source, whereby said rinsing liquid remains substantially neutral and can be used repeatedly.

2. A process of washing fruit to remove spray residue therefrom preparatory to packing, comprising subjecting the fruit to an alkaline washing treatment, rinsing the fruit with a substantially neutral rinse liquid to remove the alkaline washing liquid adhering to the fruit, subjecting the fruit to an acid washing treatment, and rinsing the fruit with the same rinse liquid used in the first rinsing step to remove the acid washing liquid adhering to the fruit, the use of the same rinse liquid for both rinsing steps providing for mutual neutralizing by the alkaline and acid washing liquids removed from the fruit by the rinsing liquid so that the rinse liquid remains substantially neutral and can be used repeatedly.

FRANK W. CUTLER.